United States Patent
Khimich et al.

(10) Patent No.: US 10,621,372 B2
(45) Date of Patent: Apr. 14, 2020

(54) METHOD AND SYSTEM FOR GENERATING DATABASE ACCESS OBJECTS

(71) Applicant: salesforce.com, inc., San Francisco, CA (US)

(72) Inventors: Oleksandr Khimich, Foster City, CA (US); Craig Howland, Fremont, CA (US); Pawan Nachnani, Newark, CA (US); Fang Wong, Fremont, CA (US); Lei Ming, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 712 days.

(21) Appl. No.: 13/859,885

(22) Filed: Apr. 10, 2013

(65) Prior Publication Data
US 2013/0297654 A1    Nov. 7, 2013

Related U.S. Application Data (60) Provisional application No. 61/642,345, filed on May 3, 2012.

(51) Int. Cl.
G06F 16/24       (2019.01)
G06F 21/62       (2013.01)

(52) U.S. Cl.
CPC ...... *G06F 21/6218* (2013.01); *G06F 21/6227* (2013.01)

(58) Field of Classification Search
CPC ............. G06F 17/30997; G06F 16/284; G06F 16/8365; G06F 16/211; G06F 16/217; G06F 16/24524; G06F 16/25
USPC ........................................................ 707/783
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |

(Continued)

OTHER PUBLICATIONS

"The Force.com Multitenant Architecture, Unterstanding the Design of Salesforce.com's Internet Application Development Platform", Oct. 21, 2008.*

(Continued)

*Primary Examiner* — Etienne P Leroux
*Assistant Examiner* — Cindy Nguyen
(74) *Attorney, Agent, or Firm* — Dergosits & Noah LLP; Todd A. Noah (57) ABSTRACT

Systems and methods are provided for generating database access objects. Metadata associated with a database table is retrieved. The metadata includes a table name, column names, foreign key information, and/or primary key information. Objects are generated. Each object is associated with a corresponding row in the database table and includes fields associated with a corresponding column in the database table. A database access object is generated based on the metadata. The database access object includes relational database code to access data associated with the objects. The database access object is modified. Data associated with an object is accessed based on the modified database access object.

20 Claims, 4 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,561,036 B1 * | 10/2013 | Beans .................. G06F 11/368 717/124 |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0208505 A1 * | 11/2003 | Mullins ............. G06F 17/30607 |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0149907 A1 * | 7/2005 | Seitz et al. ..................... 717/108 |
| 2005/0283478 A1 * | 12/2005 | Choi ...................... H04L 67/02 |
| 2006/0074953 A1 * | 4/2006 | Dettinger .......... G06F 17/30392 |
| 2009/0063415 A1 | 3/2009 | Chatfield et al. |
| 2009/0100342 A1 | 4/2009 | Rueben et al. |
| 2009/0177744 A1 | 7/2009 | Marlow et al. |
| 2010/0070528 A1 * | 3/2010 | Collins ............ G06F 17/30997 707/776 |
| 2010/0082646 A1 * | 4/2010 | Meek .................... G06F 16/252 707/752 |
| 2010/0185693 A1 * | 7/2010 | Murty .................... G06Q 10/06 707/803 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |

OTHER PUBLICATIONS

U.S. Appl. No. 13/998,890.
U.S. Appl. No. 13/987,075.
U.S. Appl. No. 13/987,074.
U.S. Appl. No. 13/998,065.
U.S. Appl. No. 13/986,744.
U.S. Appl. No. 13/986,251.

* cited by examiner

METHOD AND SYSTEM FOR GENERATING DATABASE ACCESS OBJECTS

CLAIM OF PRIORITY

This application claims the benefit of U.S. Provisional Patent Application 61/642,345 entitled DATABASE ACCESS OBJECT GENERATOR, by Khimich, et al., filed May 3, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

GENERATING DATABASE ACCESS OBJECTS

One or more implementations relate generally to generating database access objects.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

An object-relational mapping tool is computer software that converts data between incompatible type systems in an object-oriented programming language. This conversion creates a virtual object database that can be used from within the object-oriented programming language. Object-oriented programming languages typically implement data management tasks by manipulating objects that are almost always composite values. For example, an address book entry that represents a single person with zero or more phone numbers and zero or more addresses may be modeled by a "person object" with fields to hold each data item that the entry includes: the person's name, a list of phone numbers, and a list of addresses. The list of addresses may itself contain "address objects," and so on. The object oriented programming language may reference the address book entry as a single object by using a single variable containing a pointer to the object. However, many relational databases, such as structured query language database management systems, only store and manipulate non-composite values, such as integers and strings organized within tables. An object-relational mapping tool may enable an object-oriented programming language to convert object values into groups of simpler values for storage in a relational database and convert the simpler values back into object values upon retrieval. The heart of the problem is translating the logical representation of objects into an atomized form that is capable of being stored in a relational database, while somehow preserving the properties of the objects and their relationships so that they can be reloaded as an object when needed. If this storage and retrieval functionality is implemented, the objects are then said to be persistent. Compared to traditional techniques of exchange between an object-oriented programming language and a relational database, an object-relational mapping tool often reduces the amount of code that a system user needs to write.

A system user may use an object-relational mapping tool to generate an object to represent each row of data in a database table. The system user may also use an object-relational mapping tool to convert the data between object values and database table values. For example, the Hibernate® object-relational mapping tool may map Java® objects to database tables through the configuration of an extensible markup language file, which the Hibernate object-relational mapping tool may use to generate skeletal source code for the persistence objects and to maintain the database schema. However, the high level of abstraction in an object-relational mapping tool generally obscures what is actually happening in the conversions to the system user. Alternatively, the user may manually write code to enable the creation, reading, updating, and deleting of data in a database table, but such manual writing of code may be a very lengthy and time-consuming process that is prone to errors. The user may also manually write code to test a configuration file for a database table by creating, reading, updating, and deleting operations on the database table.

BRIEF SUMMARY

In accordance with embodiments, there are provided systems and methods for generating database access objects. Metadata associated with a database table is retrieved, wherein the metadata includes a table name, column names, foreign key information, and/or primary key information. For example, a system retrieves database schema metadata for a table that identifies the table's name as "business contacts," and the table's columns as "contact first name," "contact last name," "contact phone number," "contact email address," and "contact mailing address." The "contact last name" is the primary key for the table, and the "contact mailing address" is a foreign key that references a "contact mailing address" table that includes columns for "contact street," "contact state," "contact zip code," and "contact country." Objects are generated, wherein each object is associated with a corresponding row in the database table and includes fields associated with a corresponding column in the database table. For example, the system creates a Java® object for the first business contact listed in the table, and the Java® object includes fields for the name, phone number, email address, and mailing address of the first business contact. A database access object is generated based on the metadata, wherein the database access object includes relational database code to access data associated with the objects. For example, the system creates Java® code to generate a database access object to access data in the table, and the Java® code includes structured query language commands to access the data listed under the specific columns in the table. The database access object is modified. For example, a system user identifies inefficient structured query language commands to access the data in the table, and uses the system to optimize the structured query language commands to access the data in the table. Data associated with an object is accessed based on the modified database access object. For example, the system responds to a request to access data in the table by using the optimized structured query language commands to efficiently access the data in the table. Accordingly, systems and methods are provided which enable the generation of database access objects.

While one or more implementations and techniques are described with reference to an embodiment in which generating database access objects is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for generating database access objects.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for generating database access objects will be described with reference to example embodiments.

The following detailed description will first describe a method for generating database access objects.

Next, an example of a system for generating database access objects is described.

Figure 1:
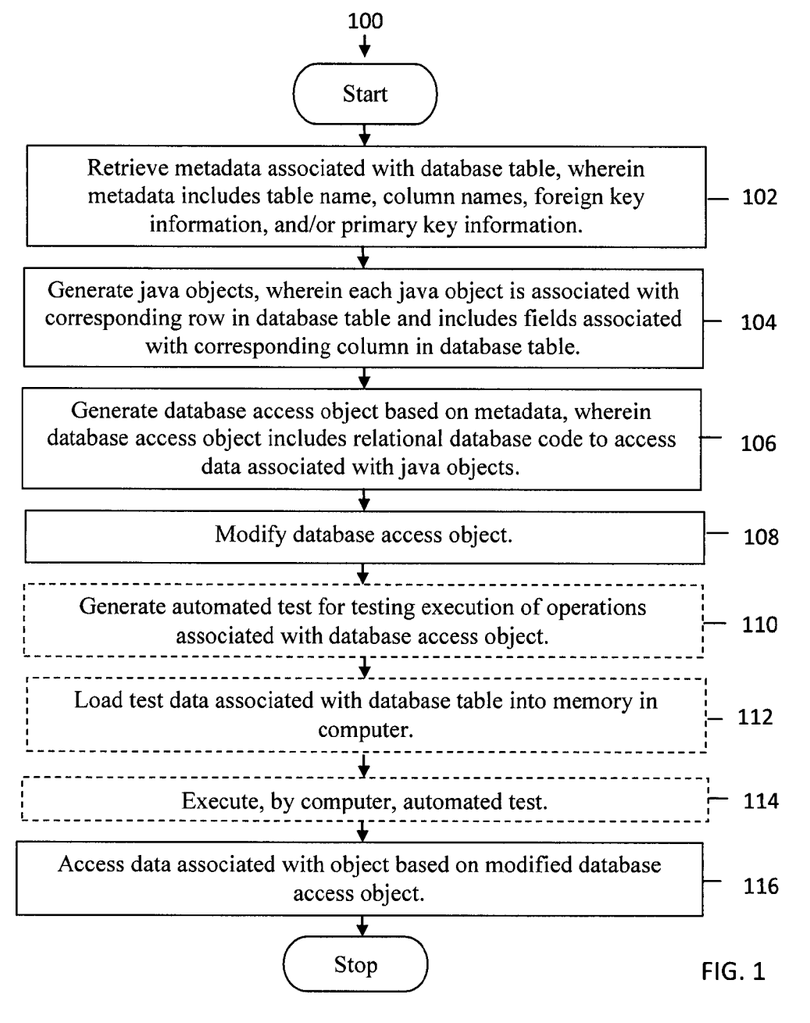
FIG. 1 is an operational flow diagram illustrating a high level overview of a method for generating database access objects in an embodiment.

FIG. 1 is an operational flow diagram illustrating a high level overview of a method 100 for generating database access objects. As shown in FIG. 1, a system can generate database access objects.

In block 102, metadata associated with a database table is retrieved, wherein the metadata includes a table name, column names, foreign key information, and/or primary key information. For example and without limitation, this can include a system retrieving database schema metadata for a table that identifies the table's name as "business contacts," and the table's columns as "contact first name," "contact last name," "contact phone number," "contact email address," and "contact mailing address." The "contact last name" is the primary key for the table, and the "contact mailing address" is a foreign key that references a "contact mailing address" table that includes columns for "contact street," "contact state," "contact zip code," and "contact country." The foreign key information provides table relationship and mapping information. The metadata may also include unique constraints information, such as the field for zip codes is limited to a five digit integer.

In block 104, objects are generated, wherein each object is associated with a corresponding row in the database table and includes fields associated with a corresponding column in the database table. By way of example and without limitation, this can include the system creating a Java® object for the first business contact listed in the table, and the Java® object includes fields for the name, phone number, email address, and mailing address of the first business contact. For the columns in the table that do not include foreign keys, the object may include fields that match the column names, such as a "contact phone number" field that matches a "contact phone number" column, and the field types correspond to their corresponding column data types, such as integers for both the "zip code" field and the "zip code" column. For the columns in the table that do include foreign keys, the object may include a field that is represented as a related object, as well as getters and setters for every field, and equals and hashCode methods based on the database unique constraints.

In block 106, a database access object is generated based on the metadata, wherein the database access object includes relational database code to access data associated with the objects. In embodiments, this can include the system creating Java® code to generate a database access object to access data in the table, and the Java® code includes structured query language commands to access the data listed under the specific columns in the table. Rather than creating a database access object that obscures the code for accessing the database table from system users, such as an extensible markup language file, the system creates a database access object that includes relational database code to access the database table that is familiar to and transparent for system users, such as structured query language code.

In block 108, the database access object is modified. For example and without limitation, this can include a system user identifying inefficient structured query language commands to access the data in the table, and using the system to request access to and optimize the structured query language commands to access the data in the table. For example, the database access object may initially include structured query language commands that inefficiently access the "business contacts" table that includes a foreign key for accessing the "mailing address," with the "mailing address" table including a foreign key for accessing a "provinces" table for countries that have provinces instead of states. In contrast to object-relational mapping tools that obscure the relational database commands to system users, the database access object includes code that lists the relational database commands, which enable easy review and modification by system users. Optimized code provides better performance and more control of database access operations.

In block 110, an automated test is optionally generated for testing execution of operations associated with the database access object. By way of example and without limitation, this can include the system generating an automated test for testing execution of the create, read, update, and delete operations for the database access object.

In block 112, test data associated with the database table is optionally loaded into a memory in a computer. In embodiments, this can include the system loading test data from the database table into the memory in the computer that executes the automated test. The system may convert the database table's files to an in-memory database structured query language syntax when loading the test data from the database table into the memory, creating an identical database schema in the in-memory database. Loading the test data into memory not only enables faster execution of the automated test, but also frees access to the database table for other system users.

In block 114, the automated test is optionally executed by the computer. For example and without limitation, this can include the computer executing the automated test to determine that attempts to access the column named "contact last name" failed because this column was renamed "contact family name" after the data access object was generated. Results from executing the automated test may be output to enable the database access object to be updated to incorporate the latest revisions to the database table. Executing the automated test may also identify problems with the data stored in the database tables, such as data types that violate unique constraints requirements. The automated test may be executed periodically, such as on a daily basis, or whenever a modification is made to a database table.

In block 116, data associated with an object is accessed based on the modified database access object. By way of example and without limitation, this can include the system responding to an end user's request to access data in the table by using the optimized structured query language commands to efficiently access the data in the table.

The method 100 may be repeated as desired. Although this disclosure describes the blocks 102-116 executing in a particular order, the blocks 102-116 may be executed in a different order.

Figure 2:
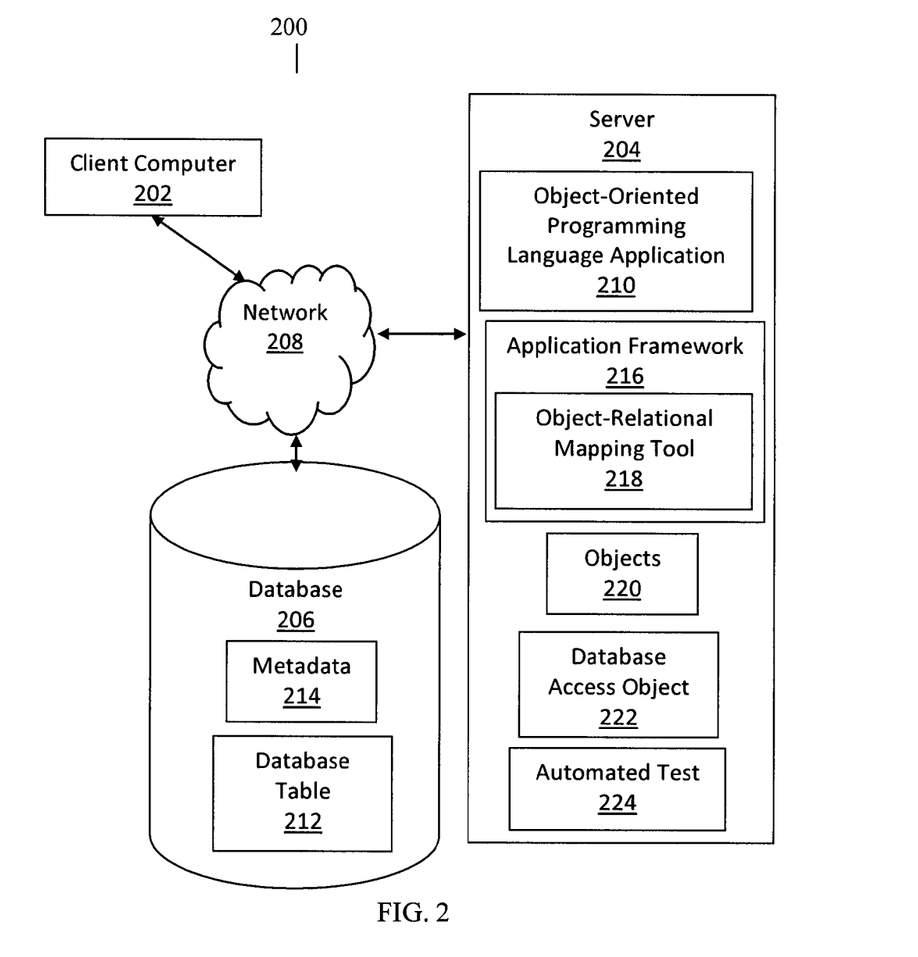
FIG. 2 illustrates a block diagram of an example of a system for generating database access objects.

FIG. 2 illustrates a block diagram of an example system that generates database access objects. As shown in FIG. 2, a system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of data for different client users. In an embodiment, the system 200 represents a cloud computing system that includes a client computer 202, a server 204, and a database 206 that communicate via a network 208. The client computer 202, which may be part of a mobile computing device, enables a user to communicate with the server 204 in a distributed system. The system 200 also includes an object-oriented programming language application 210 that a system user wants to access data stored in a database table 212 that is associated with metadata 214 in a relational database. The server 204 also includes an application framework 216 that incorporates an object-relational mapping tool 218, which a system user can use to generate the objects 220, the database access objects 222, and the automated test 224. Although FIG. 2. depicts the application framework 216, the object-relational mapping tool 218, the objects 220, the database access objects 222, and the automated test 224 residing in the server 204, any portion of the application framework 216, the object-relational mapping tool 218, the objects 220, the database access objects 222, and the automated test 224 may reside additionally or alternatively in the client computer 202. Although FIG. 2 depicts the system 200 with one of each of the elements 202-224, the system 200 may include any number of each of the elements 202-224.

The application framework 216 retrieves the metadata 214 associated with the database table 212, wherein the metadata 214 includes a table name, column names, foreign key information, and/or primary key information. For example, the Spring framework 216, which incorporates the object-relational mapping tool 218, retrieves database schema metadata 214 for a table 212 that identifies the table's name as "business contacts," and the table's columns as "contact first name," "contact last name," "contact phone number," "contact email address," and "contact mailing address." The application framework 216 generates the objects 220, wherein each of the objects 220 is associated with a corresponding row in the database table 212 and includes fields associated with a corresponding column in the database table 212. For example, the Spring framework 216 creates a Java® object 220 for the first business contact listed in the table 212, and the Java® object 220 includes fields for the name, phone number, email address, and mailing address of the first business contact. The application framework 216 generates the database access object 222 based on the metadata 214, wherein the database access object 222 includes relational database code to access data associated with the objects 220. For example, the Spring framework 216 creates Java® code to generate the database access object 222 to access data in the table 212, and the Java® code includes structured query language commands to access the data listed under the specific columns in the table 212. The application framework 216 modifies the database access object 222. For example, a system user identifies inefficient structured query language commands to access the data in the table 212, and uses the server 204 to optimize the structured query language commands to access the data in the table 212.

The application framework 216 generates the automated test 224 for testing execution of operations associated with the database access object 222. For example, the Spring framework 216 generates the automated test 224 or testing execution of the create, read, update, and delete operations of the database access object 222. The application framework 216 loads test data associated with the database table 212 into a memory in a computer. For example, the Spring framework 216 loads test data from the database table 212 into the memory in the server 204 that executes the automated test 224. The computer executes the automated test 224. For example, the server 204 executes the automated test 224 to test execution of the execution of the create, read, update, and delete operations of the database access object 222. The server 204 accesses data associated with an object 218 based on the modified database access object 222. For example, the server 204 responds to a end user's request to access data in the table 212 by using the optimized structured query language commands to efficiently access the data in the table 212.

System Overview

Figure 3:
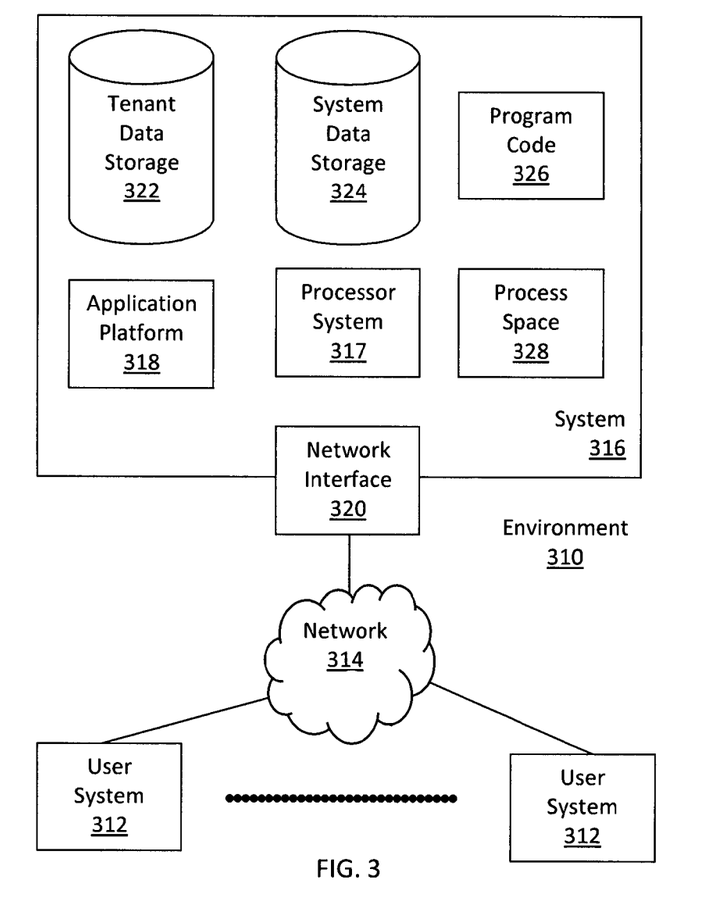
FIG. 3 illustrates a block diagram of an example of an environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
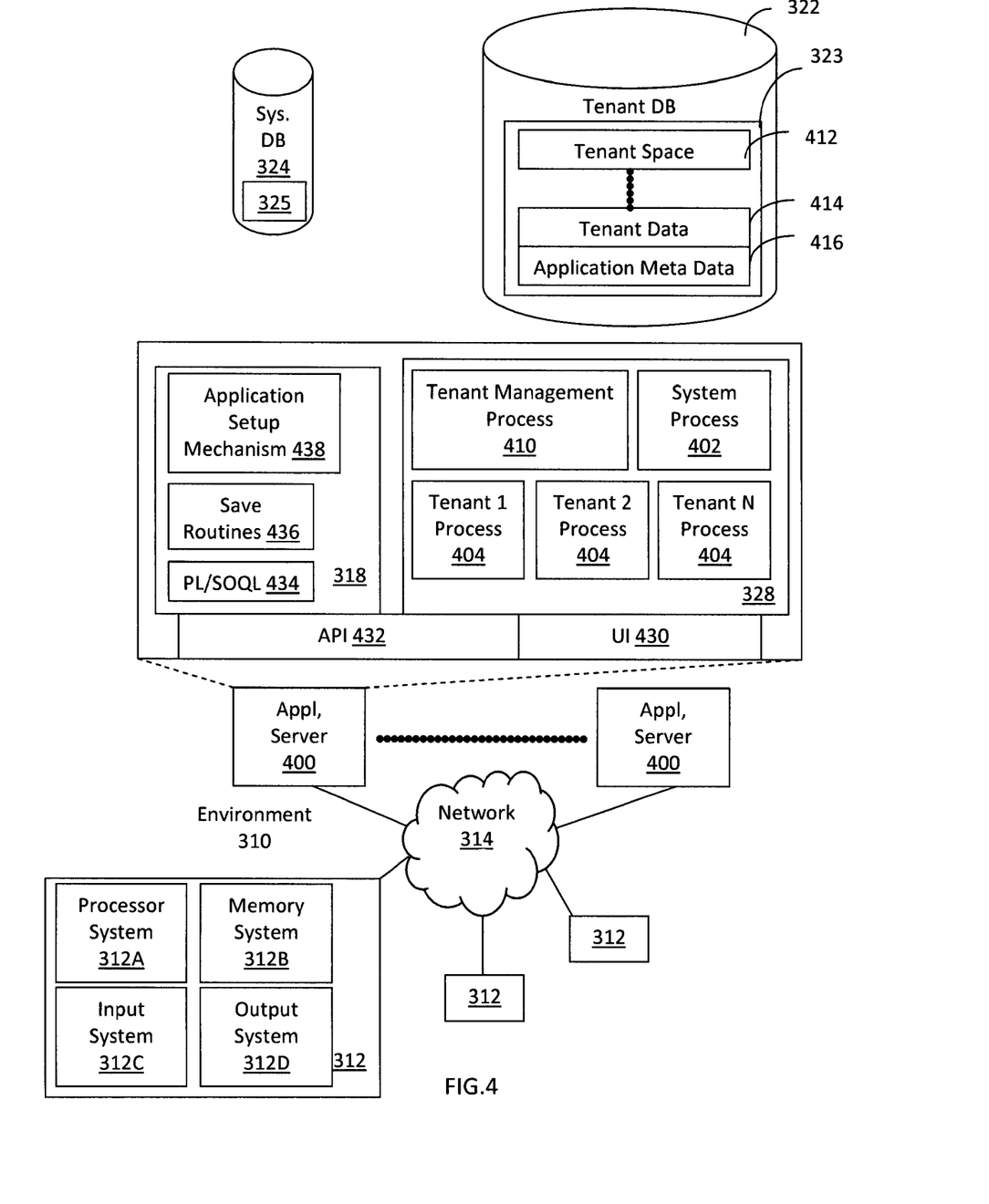
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers 4001-400N, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 34 that provides a programming language style interface extension to API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server 400₁ might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for generating database access objects from a relational database table, the apparatus comprising:
a processor; and
one or more stored sequences of instructions which, when executed by the processor, cause the processor to carry out the steps of:
retrieving database schema metadata for the relational database table having a plurality of rows, the metadata comprising a plurality of column names and at least one of a table name, foreign key information, and primary key information, the relational database table storing data;
generating an object for each row in the relational database table, each of the plurality of generated objects comprising a plurality of fields, each of the plurality of fields being associated with a column name of the plurality of column names;
generating a relational database access object based on the metadata, the relational database access object comprising computer program code that includes relational database commands, which when executed, enables access to the data from the relational database table and storing the accessed data within a generated object;
receiving a modification of the relational database access object, the modified relational database access object including an optimized relational database command code, which when executed, enables access to the data from the relational database table and storing the accessed data within the generated object; and
accessing the data from the relational database table and store the accessed data within the object of the plurality of objects using the optimized relational database command code.

2. The apparatus of claim 1, wherein the modification of the relational database access object is preceded by a request to modify the database access object.

3. The apparatus of claim 1, wherein the relational database commands comprise a command to perform at least one of creating the data, reading the data from the relational database table, updating the data from the relational database table, and deleting the data from the relational database table.

4. The apparatus of claim 1 wherein the steps further comprise generating an automated test for testing execution of operations associated with the database access object.

5. The apparatus of claim 4, wherein the steps further comprise: loading test data associated with the database table into a memory in a computer; and executing, by the computer, the automated test.

6. A non-transitory machine-readable medium carrying one or more sequences of instructions for generating database access objects from a relational database table, which instructions, when executed by one or more processors, cause the one or more processors to carry out the steps of:
retrieving metadata associated with the relational database table, wherein the metadata comprises a plurality of column names and at least one of a table name, foreign key information, and primary key information, the relational database table storing data;
generating a plurality of objects linked to the relational database table, wherein each of the plurality of objects is associated with a corresponding row in the database table and comprises a plurality of fields, wherein each of the plurality of fields is associated with a column name of the plurality of column names;
generating a relational database access object based on the metadata, wherein the relational database access object comprises computer program code that includes relational database commands, the relational database commands accessing the data from the relational database table and storing the accessed data within an object of the plurality of objects when the relational database commands are executed;
receiving a modification of the relational database access object, the modified relational database access object including an optimized relational database command code, the optimized relational database command code accessing the data from the relational database table and storing the accessed data within the object of the plurality of objects when the relational database commands are executed; and
accessing the data from the relational database table and storing the accessed data within the object of the plurality of objects using the optimized relational database command code.

7. The non-transitory machine-readable medium of claim 6, wherein the modification of the relational database access object is preceded by a request to modify the database access object.

8. The non-transitory machine-readable medium of claim 6, wherein the relational database commands comprise a command to perform at least one of creating the data, reading the data from the relational database table, updating the data from the relational database table, and deleting the data from the relational database table.

9. The non-transitory machine-readable medium of claim 6, wherein the steps further comprise generating an automated test for testing execution of operations associated with the database access object.

10. The non-transitory machine-readable medium of claim 9, wherein the steps further comprise: loading test data associated with the database table into a memory in a computer; and executing, by the computer, the automated test.

11. A method for generating database access objects from a relational database table, the method comprising:
 retrieving, by a computing device, database schema metadata for the relational database table having a plurality of rows, the metadata comprising a plurality of column names and at least one of a table name, foreign key information, and primary key information, the relational database table storing data;
 generating, by the computing device, an object for each row in the relational database table, each of the plurality of generated objects comprising a plurality of fields, each of the plurality of fields being associated with a column name of the plurality of column names;
 generating, by the computing device, a relational database access object based on the metadata, the relational database access object comprising computer program code that includes relational database commands, which when executed, enables access to the data from the relational database table and storing the accessed data within a generated object;
 receiving, by the computing device, a modification of the relational database access object, the modified relational database access object including an optimized relational database command code, which when executed, enables access to the data from the relational database table and storing the accessed data within the generated object; and
 accessing the data from the relational database table and storing the accessed data within the object of the plurality of objects using the optimized relational database command code.

12. The method of claim 11, wherein the modification of the relational database access object is preceded by a request to modify the database access object.

13. The method of claim 11, wherein the relational database commands comprise a command to perform at least one of creating the data, reading the data from the relational database table, updating the data from the relational database table, and deleting the data from the relational database table.

14. The method of claim 11, wherein the method further comprises generating, by the computing device, an automated test for testing execution of operations associated with the database access object.

15. The method of claim 14, wherein the method further comprises: loading test data associated with the database table into a memory in a computer; and executing, by the computer, the automated test.

16. A system for generating database access objects from a relational database table, the system comprising:
 a processor-based application stored on a non-transitory machine-readable medium, executed on a computer, and configured to:
  retrieve database schema metadata for the relational database table having a plurality of rows, the metadata comprising a plurality of column names and at least one of a table name, foreign key information, and primary key information, the relational database table storing data;
  generate an object for each row in the relational database table, each of the plurality of generated objects comprising a plurality of fields, each of the plurality of fields being associated with a column name of the plurality of column names;
  generate a relational database access object based on the metadata, wherein the relational database access object comprising computer program code that includes relational database commands, which when executed, enables access to the data from the relational database table and storing the accessed data within a generated object;
  receive a modification of the relational database access object, the modified relational database access object including an optimized relational database command code, which when executed, enables access to accessing the data from the relational database table and storing the accessed data within the generated object; and
  access the data from the relational database table and storing the accessed data within the object of the plurality of objects using the optimized relational database command code.

17. The system of claim 16, wherein the modification of the relational database access object is preceded by a request to modify the database access object.

18. The system of claim 16, wherein the relational database commands comprise a command to perform at least one of creating the data, reading the data from the relational database table, updating the data from the relational database table, and deleting the data from the relational database table.

19. The system of claim 16, the processor-based application further configured to generate an automated test for testing execution of operations associated with the database access object.

20. The system of claim 19, the processor-based application further configured to load test data associated with the database table into a memory in a computer; and to execute, by the computer, the automated test.

* * * * *